US008943318B2

(12) United States Patent
Lee et al.

(10) Patent No.: US 8,943,318 B2
(45) Date of Patent: Jan. 27, 2015

(54) SECURE MESSAGING BY KEY GENERATION INFORMATION TRANSFER

(75) Inventors: Kwai Yeung Lee, Pittsburg, CA (US); William C. King, Lafayette, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 179 days.

(21) Appl. No.: 13/469,227

(22) Filed: May 11, 2012

(65) Prior Publication Data

US 2013/0305040 A1 Nov. 14, 2013

(51) Int. Cl.
*H04L 9/00* (2006.01)
*H04L 9/32* (2006.01)

(52) U.S. Cl.
CPC .................................. *H04L 9/32* (2013.01)
USPC ........... 713/168; 713/155; 713/170; 713/171; 713/185; 726/3; 726/4; 726/6; 726/12; 705/64; 705/75; 709/227; 709/228; 380/228; 380/255; 380/278; 380/279

(58) Field of Classification Search
CPC ......... H04L 9/32; H04L 29/06; H04L 9/3244; H04L 9/00
See application file for complete search history.

(56) References Cited

U.S. PATENT DOCUMENTS

| | | | |
|---|---|---|---|
| 5,986,568 A * | 11/1999 | Suzuki et al. .................. 340/9.1 |
| 7,136,651 B2 | 11/2006 | Kalavade | |
| 7,386,878 B2 * | 6/2008 | Fernando et al. .................. 726/3 |
| 7,954,141 B2 | 5/2011 | De Lutiis et al. | |
| 8,230,035 B2 | 7/2012 | Morgan et al. | |
| 8,353,011 B2 * | 1/2013 | Bajko et al. ........................ 726/4 |
| 2003/0177401 A1 | 9/2003 | Arnold et al. | |
| 2004/0145773 A1 * | 7/2004 | Oakeson et al. ............. 358/1.15 |
| 2008/0065891 A1 * | 3/2008 | Karamchedu et al. ........ 713/171 |
| 2008/0133761 A1 | 6/2008 | Polk | |
| 2008/0307511 A1 * | 12/2008 | Ahtisaari .......................... 726/4 |
| 2009/0063851 A1 * | 3/2009 | Nijdam .......................... 713/155 |
| 2009/0067628 A1 | 3/2009 | Pudney et al. | |
| 2009/0089583 A1 * | 4/2009 | Patel ............................. 713/171 |
| 2009/0094457 A1 * | 4/2009 | Lapstun et al. ............... 713/168 |

(Continued)

OTHER PUBLICATIONS

"3rd Generation Partnership Project; Technical Specification Group Services and System Aspects; Key Establishment between a Universal Integrated Circuit Card (UICC) and a Terminal (Release 9)"; 3GPP TS 33.110 V9.0.0, Dec. 2009, pp. 1-28.

(Continued)

*Primary Examiner* — Morshed Mehedi
*Assistant Examiner* — Sharon Lynch

(57) ABSTRACT

A system is configured to receive a first authentication request from a first device, authenticate the first device, establish a secure connection with the first device based on authenticating the first device, and receive, via the secure connection with the first device, a set of parameters from the first device. The first device is capable of generating an encryption key for a secure message, intended for a second device, based on the set of parameters. The system is also configured to receive a second authentication request from a second device, authenticate the second device and establish a secure connection with the second device based on receiving the second authentication request, and send, via the secure connection with the second device, the set of parameters to the second device. The second user device is capable of generating a decryption key for the secure message based on the set of parameters.

21 Claims, 10 Drawing Sheets

(56) References Cited

U.S. PATENT DOCUMENTS

| | | | |
|---|---|---|---|
| 2009/0158034 A1* | 6/2009 | Gu et al. | 713/156 |
| 2009/0180614 A1* | 7/2009 | Rajagopal et al. | 380/228 |
| 2010/0030904 A1* | 2/2010 | Oda et al. | 709/228 |
| 2010/0054472 A1 | 3/2010 | Barany et al. | |
| 2010/0153726 A1* | 6/2010 | Liu et al. | 713/171 |
| 2010/0268937 A1* | 10/2010 | Blom et al. | 713/153 |
| 2010/0273455 A1* | 10/2010 | Tamura et al. | 455/412.1 |
| 2011/0055565 A1* | 3/2011 | Murakami et al. | 713/168 |
| 2011/0091036 A1 | 4/2011 | Norrman et al. | |
| 2011/0167272 A1* | 7/2011 | Kolesnikov | 713/171 |
| 2011/0185070 A1* | 7/2011 | Xue et al. | 709/227 |
| 2011/0206206 A1 | 8/2011 | Blom et al. | |
| 2012/0027211 A1* | 2/2012 | Lehtovirta et al. | 380/255 |
| 2012/0109830 A1* | 5/2012 | Vogel | 705/75 |
| 2012/0204027 A1* | 8/2012 | Baek et al. | 713/155 |
| 2012/0311329 A1* | 12/2012 | Medina et al. | 713/168 |
| 2012/0322416 A1* | 12/2012 | Sundaram et al. | 455/411 |
| 2013/0024686 A1* | 1/2013 | Drucker | 713/155 |
| 2013/0060708 A1* | 3/2013 | Oskolkov et al. | 705/75 |
| 2013/0085880 A1* | 4/2013 | Roth et al. | 705/26.1 |
| 2013/0091556 A1* | 4/2013 | Horn et al. | 726/4 |
| 2013/0315389 A1* | 11/2013 | Jung et al. | 380/31 |

OTHER PUBLICATIONS

"3$^{rd}$ Generation Partnership Project; Technical Specification Group Services and System Aspects; Generic Authentication Architecture (GAA); Generic bootstrapping Architecture (Release 9)"; 3GPP TS 33.220 V9.3.0, Jun. 2010, pp. 1-75.

"3$^{rd}$ Generation Partnership Project; Technical Specification Group Services and System Aspects; 3GPP System Architecture Evolution (SAE); Security Architecture (Release 9)"; 3GPP TS 33.401 V9.6.0, Dec. 2010, pp. 1-105.

* cited by examiner

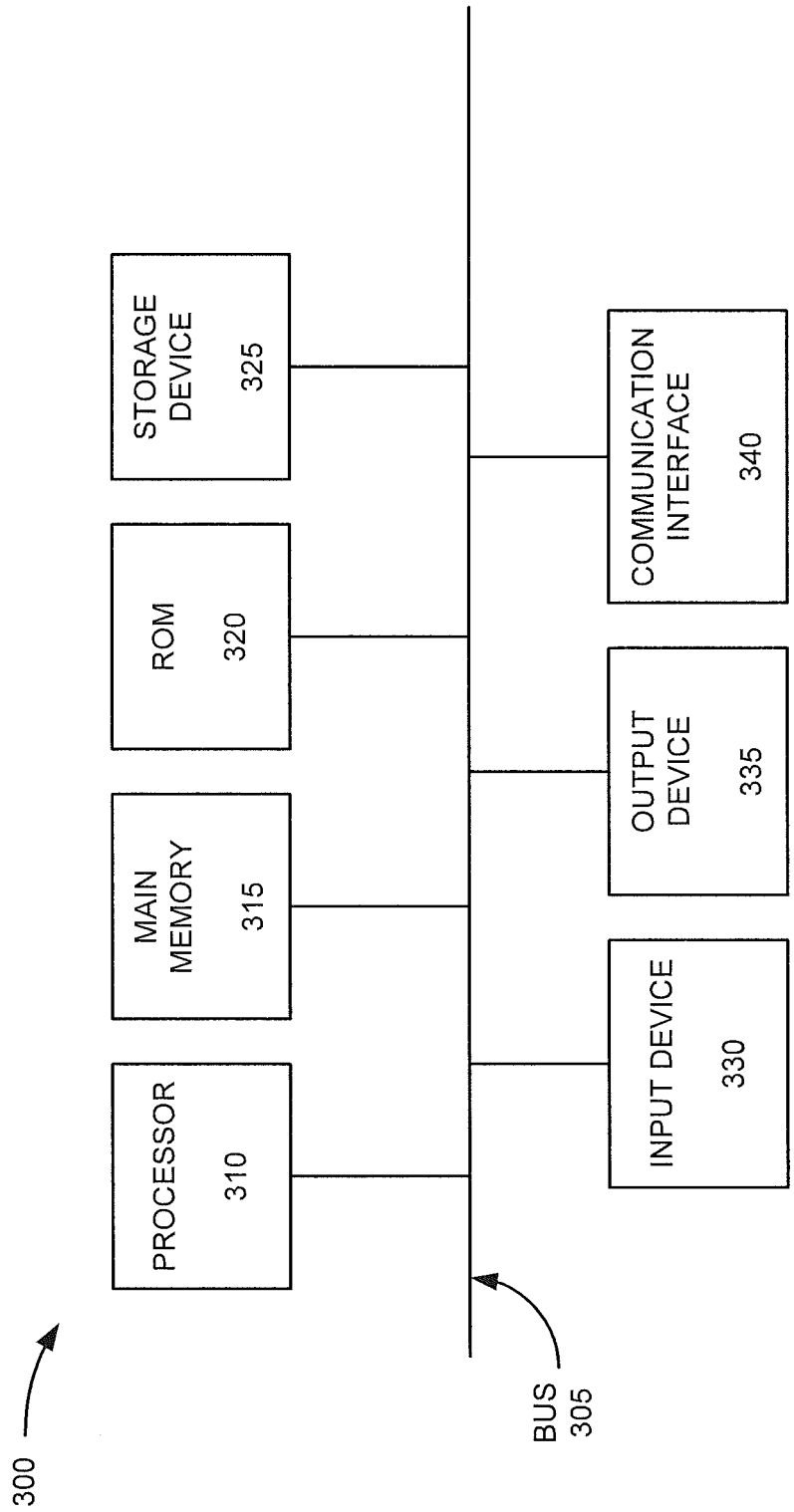

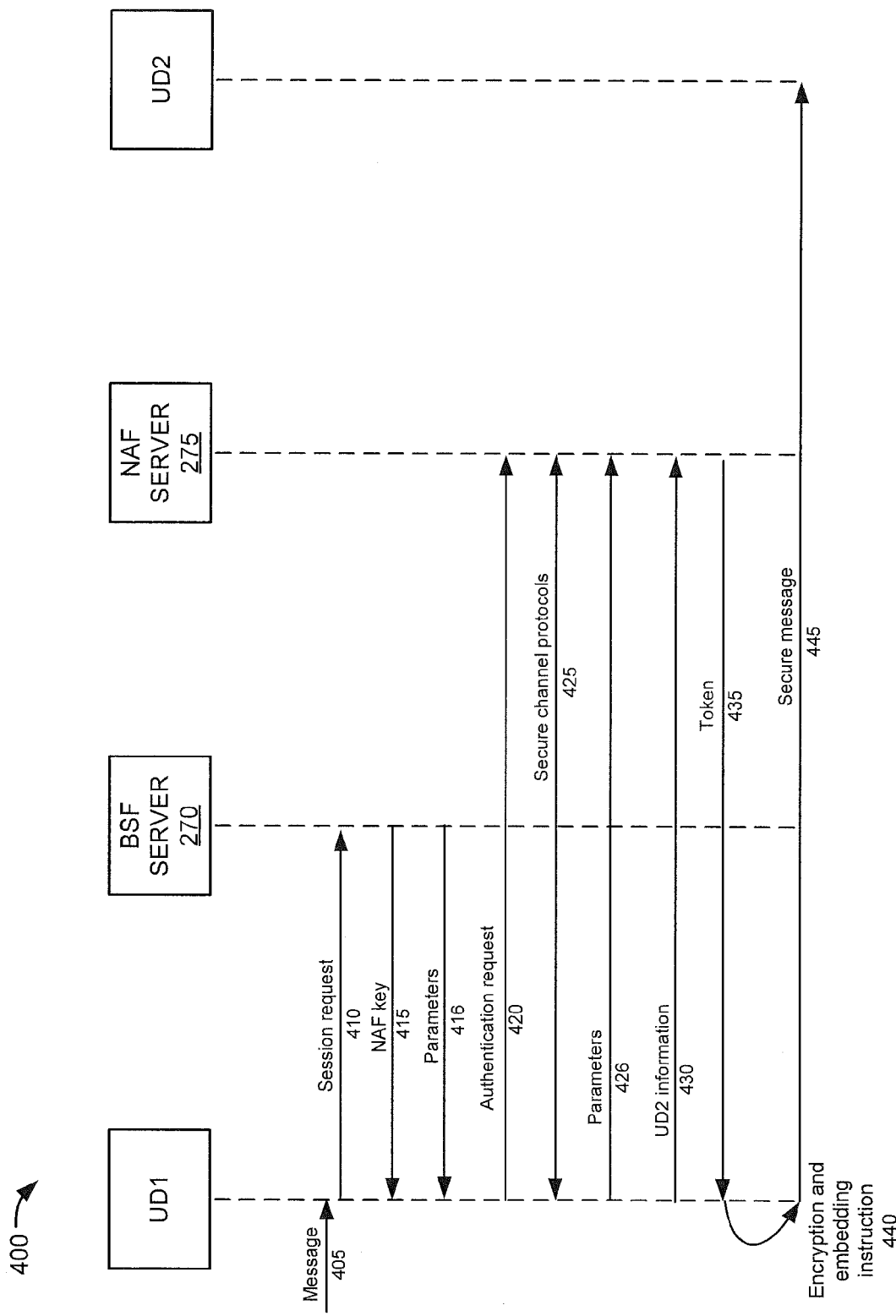

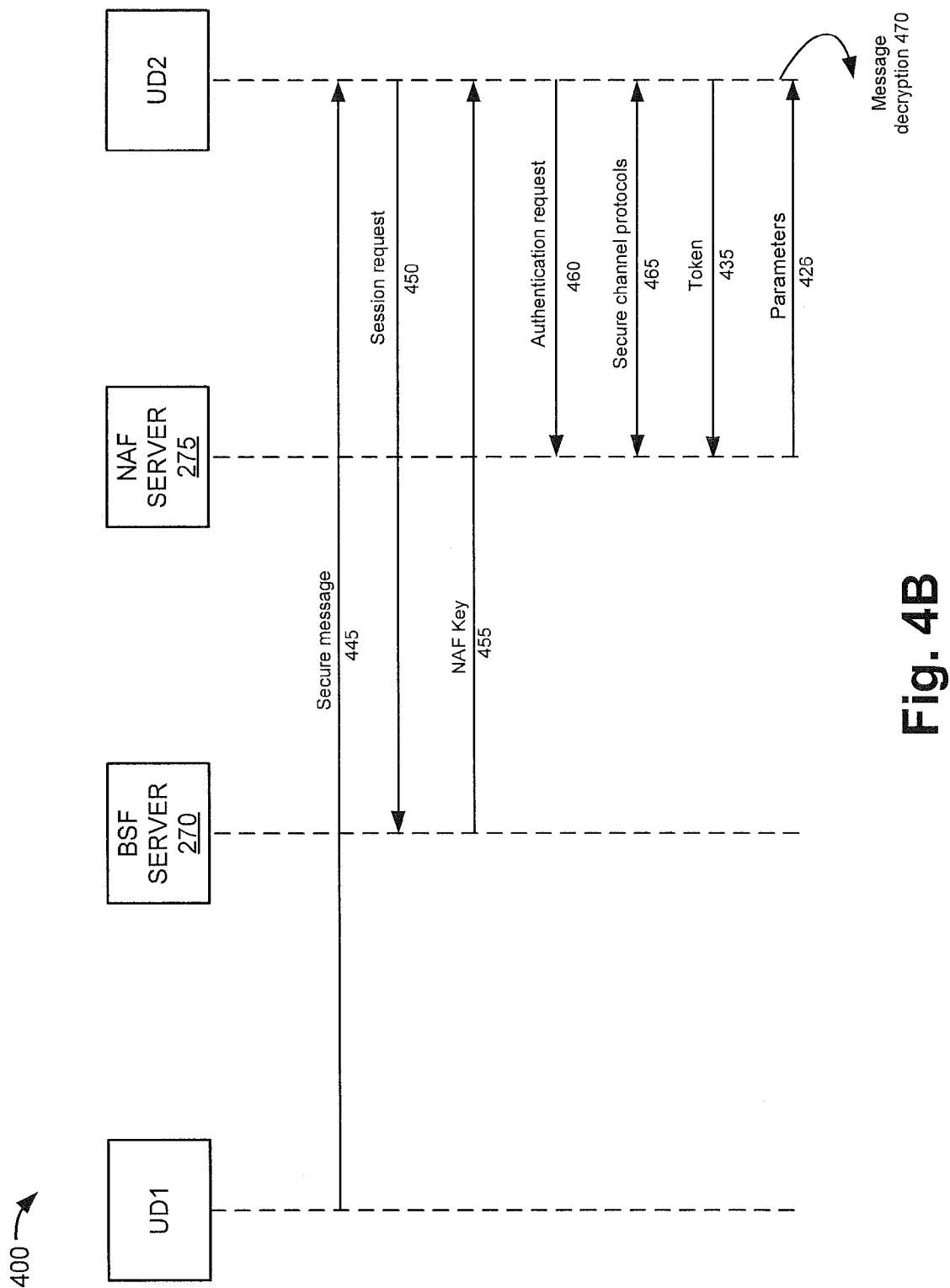

| Token ID | Parameter 1 | Parameter 2 | Parameter 3 | Parameter N | Recipient Device Authentication | | |
|---|---|---|---|---|---|---|---|
| | B-TID | UICC | Terminal App ID | | Phone # | IMEI | ICCID |
| 1 | 74841566 | 45453687 | 5678 | | 5555551212 | 49015420323751 8 | 32144898425582 7 |
| 2 | 47842157 | 78412384 | 9012 | | 5555551000 | 45132154878455 1 | 12318484513221 5 |
| 3 | 75374899 | 47856648 | 3456 | | 5555551001 | 48451214878987 2 | 48551215484845 2 |

Fig. 5

SECURE MESSAGING BY KEY GENERATION INFORMATION TRANSFER

BACKGROUND

Users often use user devices to send and receive electronic messages in the form of short message service (SMS) texts, electronic mail (e-mail) messages, or some other type of message. Electronic messages can be transmitted over a network, such as a cellular network or the World Wide Web ("web"). During transmission, electronic messages can be exposed to security risks, thereby exposing potentially sensitive and private information within the electronic message.

BRIEF DESCRIPTION OF THE DRAWINGS

FIG. 3 illustrates example components of a device that may be used within the environment of FIG. 2;

FIGS. 4A-4B illustrate a call flow diagram of example operations capable of being performed by an example portion of the environment of FIG. 2;

FIG. 5 illustrates an example data structure that may be stored by a network authentication function server;

DETAILED DESCRIPTION OF THE PREFERRED EMBODIMENTS

The following detailed description refers to the accompanying drawings. The same reference numbers in different drawings may identify the same or similar elements.

A system and/or method, as described herein, may ensure the secure exchange of electronic messages (hereinafter referred to as "messages") between one or more user devices. The message may be in the form of an e-mail, SMS text, Multimedia Messaging Service (MMS) file, image file, video file, text file, instant message (IM), and/or some other computer file. For example, the system and/or method may allow a message sender user device (referred to as "UD1") to send security parameters (referred to as "parameters") to a recipient user device (referred to as "UD2"), via one or more authentication servers. The authentication server(s) may act as a secure gatekeeper for the parameters. In some implementations, the parameters may be used by UD1 to generate an encryption key to encrypt the message. Additionally, or alternatively, the parameters may be used by UD2 to generate a decryption key to decrypt the encrypted message.

In some implementations, the parameters may be based on information embedded in a subscriber identity module (SIM) card, associated with UD1, and/or some other information. In some implementations, the user devices may exchange the parameters used to generate the encryption and/or decryption key via authentication server(s), without exchanging the encryption and/or decryption keys themselves. For example, multiple layers of authentication may be used to allow the user devices to exchange the parameters via the authentication server(s) (e.g., authentication techniques in accordance with a Generic Bootstrapping Architecture (GBA) process and/or some other authentication technique).

Figure 1A:
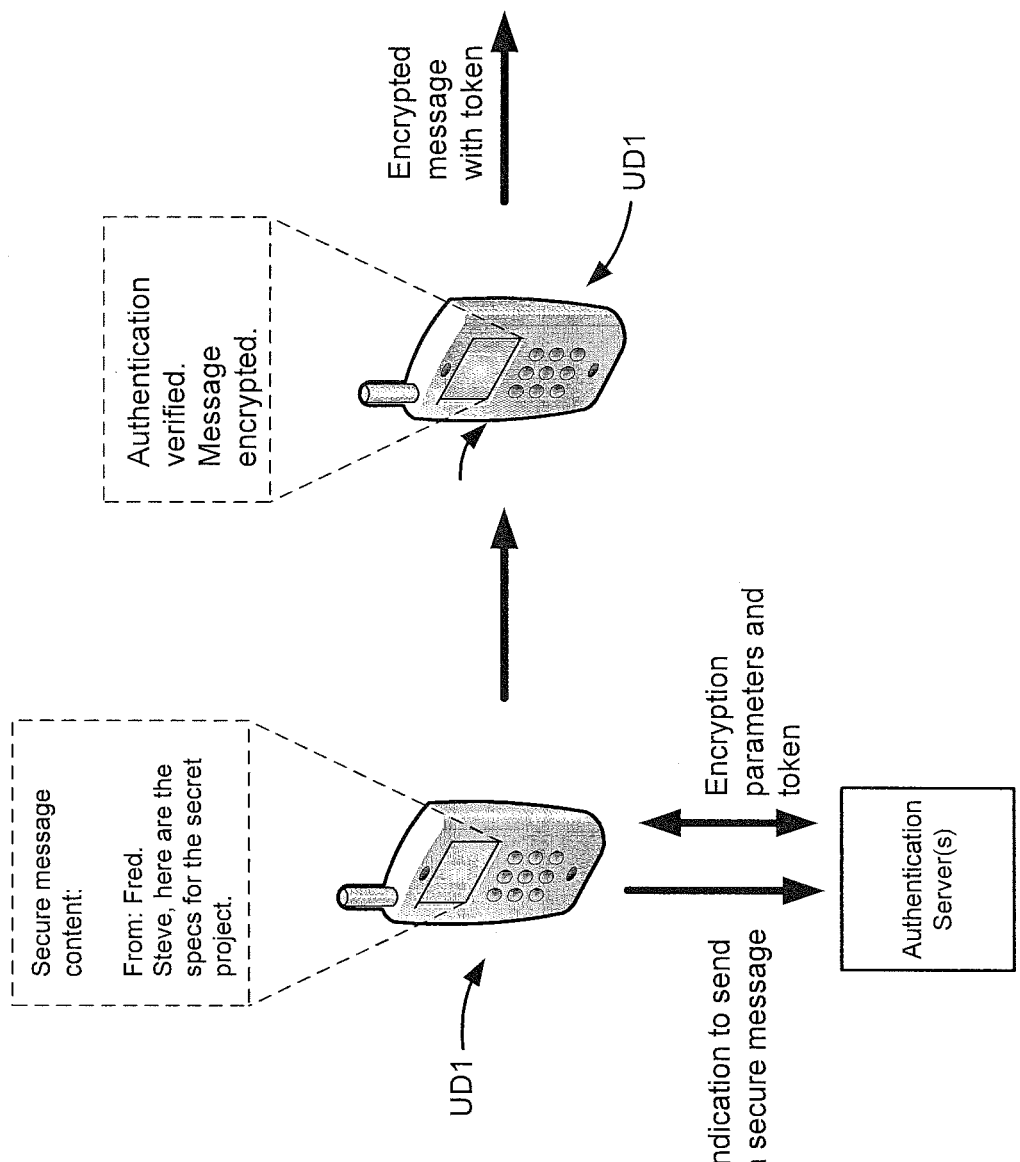
FIGS. 1A-1B illustrate an example overview of an implementation described herein.
Figure 1B:
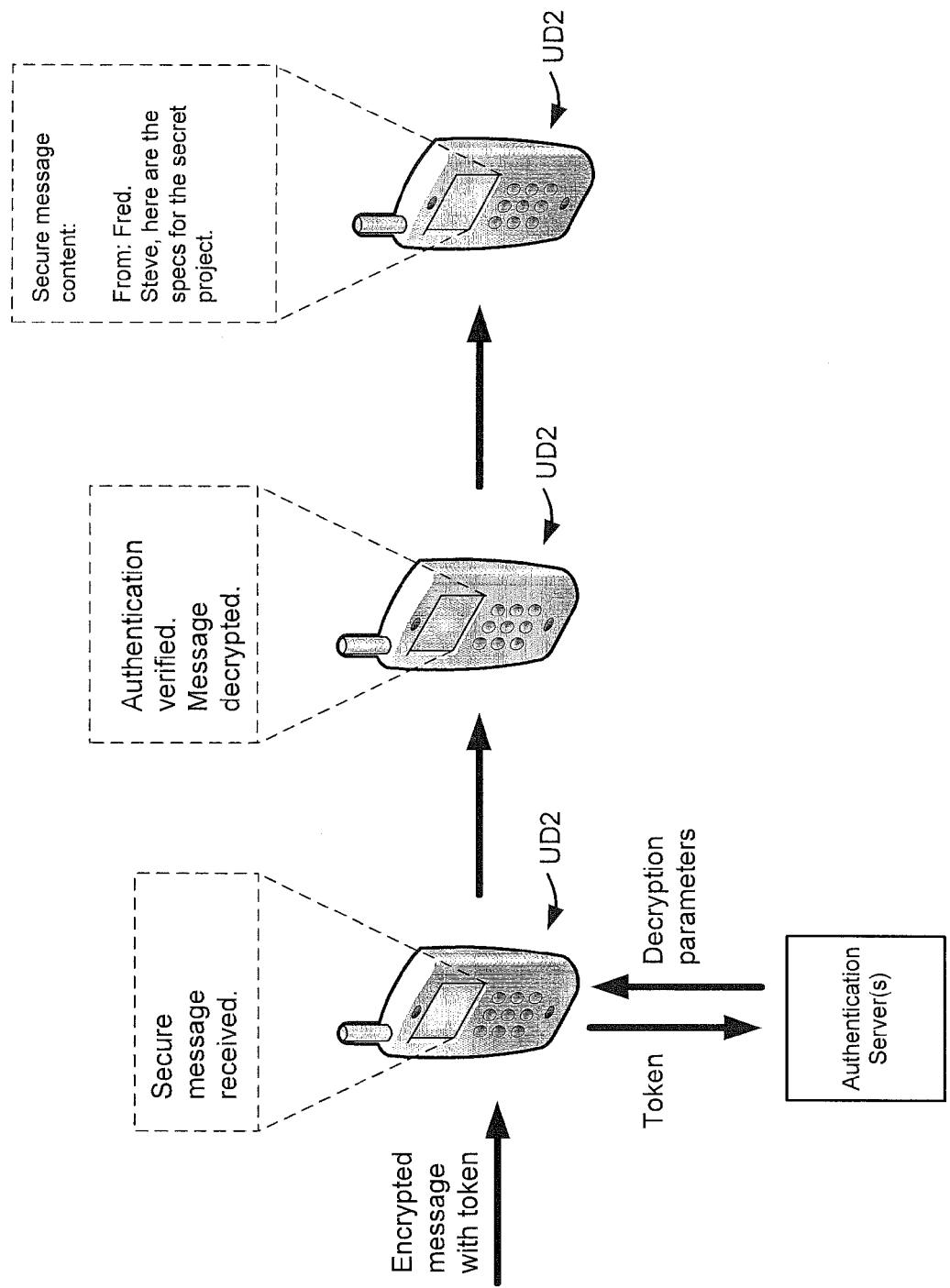

FIGS. 1A and 1B illustrate an example overview implementation described herein. As shown in FIG. 1A, assume that one or more authentication server(s) receive an indication to send a secure message from UD1 to UD2 (e.g., based on receiving an instruction from a user, associated with UD1). In some implementations, the authentication server(s) may include a Bootstrapping Function (BSF) server, a Network Application Function (NAF) server, and/or some other server. Based on receiving the indication to send a secure message, the authentication server(s) may authenticate UD1 to receive parameters used to encrypt the message (e.g., in accordance with a GBA process and/or some other authentication process). UD1 may also receive a token, associated with the parameters and associated with authentication information for UD2. In some implementations, the UD1 may embed the token within the message. As further shown in FIG. 1A, UD1 may encrypt the message based on the received parameters (e.g., by creating an encryption key). In one implementation, and as shown in FIG. 1A, UD1 may display an indication that authentication for UD1 has been verified, and that the message has been encrypted. Alternatively, UD1 may forgo displaying such an indication altogether while carrying out the function of encrypting the message. In response to encrypting the message, UD1 may send the message and the token to UD2.

Continuing with the above example, and as shown in FIG. 1B, assume that UD2 has received the message and the token associated with the message. UD2 may identify that the message received is a secure message based on a header of the message, that the token is associated with the message, and/or some other indication. In one implementation, and as shown in FIG. 1B, UD2 may display that a secure message has been received. Alternatively, UD2 may forgo displaying such an indication.

In response to identifying that a secure message has been received, UD2 may send the token to the authentication servers. The authentication server(s) may initiate one or more authentication functions of UD2 based on receiving the token. Additionally, or alternatively, the authentication server(s) may identify parameters associated with the token, and/or information used to authenticate UD2. The authentication server(s) may authenticate UD2 to determine if UD2 is authorized to receive the parameters to decrypt the message. The authentication server(s) may send the parameters to UD2 based on successful authentication of UD2. As also shown in FIG. 1B, UD2 may decrypt the message based on the parameters, and present the message on a display associated with UD2.

In some implementations, multiple layers of authentication (e.g., in accordance with the GBA process and/or some other process) may be used to allow the user devices to exchange the parameters via the authentication servers. For example, the BSF server may authenticate UD1 to receive the parameters and to receive a key to access the NAF server. UD1 may access the NAF server to provide the NAF server with the parameters, which UD2 may receive to generate a decryption key. Additionally, or alternatively, the NAF server may generate a token associated with authentication information for UD2 and with parameters received from UD1.

In the context of UD2 receiving the secure message with the token, the BSF server may authenticate UD2 to receive a key to access the NAF server. UD2 may access the NAF server to provide the NAF server with the token embedded in the secure message, and to receive the parameters associated with the token. The NAF server may use the token to authenticate UD2, and to identify the parameters associated with the token. Based on authentication of UD2, the NAF server may provide the parameters to UD2. UD2 may use the parameters to create a decryption key to decrypt the secure message. As a result, the user devices may exchange the parameters used to generate the encryption and/or decryption key, without exchanging the encryption and/or decryption keys themselves. Further, the parameters are exchanged via authentication servers using multiple authentication layers.

While an example, described with respect to FIGS. 1A-1B, is described in terms of two user devices (i.e., "UD1" and "UD2"), in practice, the example in FIGS. 1A-1B is not so limited and may apply to an environment with any number of user devices. For example, FIGS. 1A-1B may apply in an environment with any number of sender user devices exchanging information with any number of recipient user devices. Further, a single user device may perform the functions of both a sender user device and a recipient user device.

Figure 2:
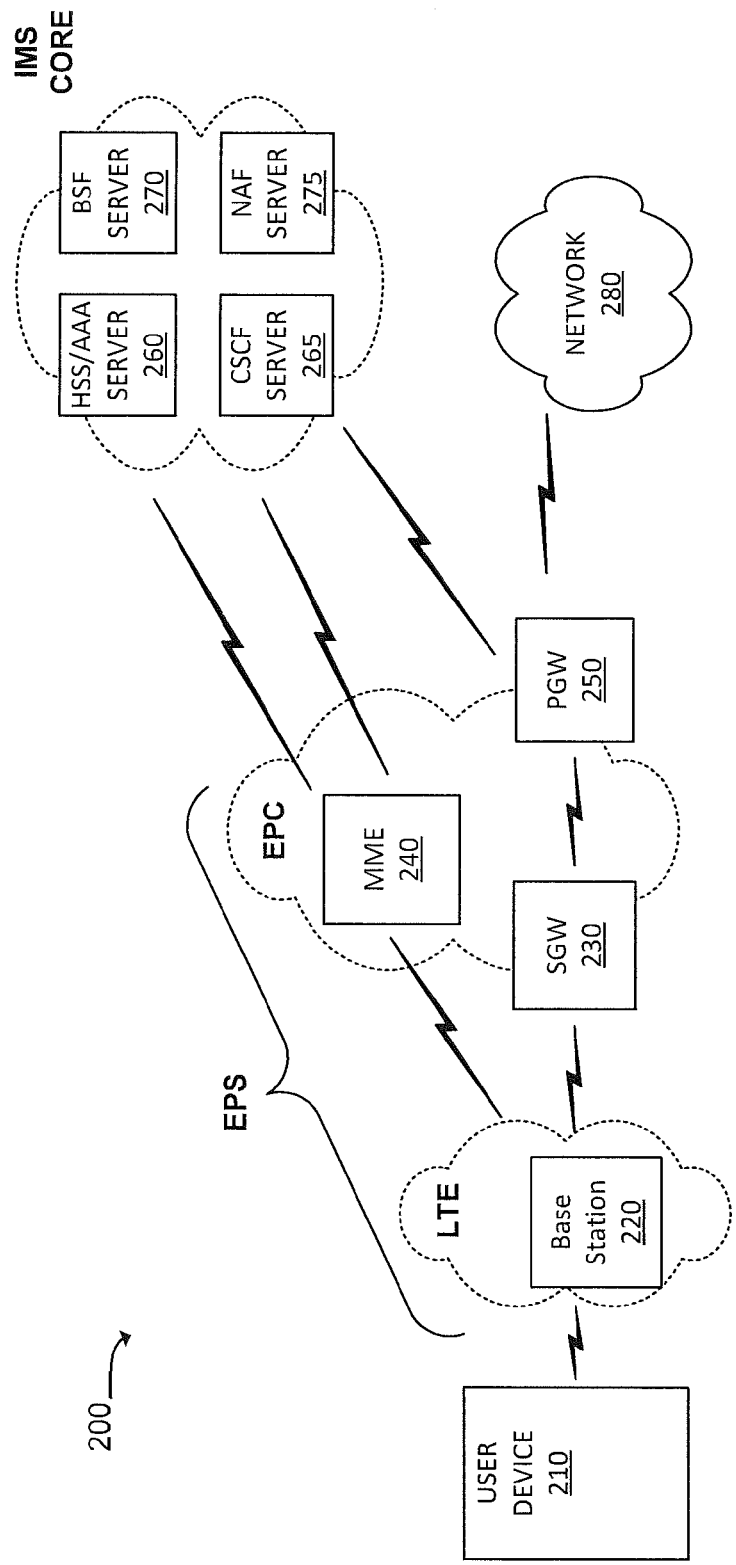
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include a user device 210, a base station 220, a serving gateway 230 (referred to as "SGW 230"), a mobility management entity device 240 (referred to as "MME 240"), a packet data network (PDN) gateway (PGW) 250, a home subscriber server (HSS)/authentication, authorization, accounting (AAA) server 260 (referred to as an "HSS/AAA server 260"), a call session control function (CSCF) server 265 (referred to as "CSCF server 265"), a bootstrapping function sever 270 (referred to as "BSF server 270"), a network authentication function server 275 (referred to as "NAF server 275"), and a network 280. The quantity of devices and/or networks, illustrated in FIG. 2, is provided for explanatory purposes only. In practice, there may be additional devices and/or networks; fewer devices and/or networks; different devices and/or networks; or differently arranged devices and/or networks than illustrated in FIG. 2.

In some implementations, one or more of the devices of environment 200 may perform one or more functions described as being performed by another one or more of the devices of environment 200. Devices of environment 200 may interconnect via wired connections, wireless connections, or a combination of wired and wireless connections.

Environment 200 may include an evolved packet system (EPS) that includes a long term evolution (LTE) network and/or an evolved packet core (EPC) that operate based on a third generation partnership project (3GPP) wireless communication standard. The LTE network may be a radio access network (RAN) that includes one or more base stations, such as eNodeBs (eNBs), via which user device 210 communicates with the EPC. The EPC may include SGW 230, MME 240, and/or PGW 250 that enables user device 210 to communicate with network 280 and/or an Internet protocol (IP) multimedia subsystem (IMS) core. The IMS core may include HSS/AAA server 260, CSCF server 265, BSF server 270 and/or NAF server 275 and may manage authentication, session initiation, account information, a user profile, etc. associated with user device 210. As shown in FIG. 2, the LTE network may include base station 220, and the EPC may include SGW 230, MME 240, and/or PGW 250.

User device 210 may include any computation or communication device, such as a wireless mobile communication device that is capable of communicating with base station 220 and/or a network (e.g., network 280). For example, user device 210 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a laptop computer, a tablet computer, a camera, a personal gaming system, or another type of mobile computation or communication device. User device 210 may send traffic to and/or receive traffic from network 280.

User device 210 may execute applications stored in a memory associated with user device 210. User device 210 may also, or alternatively, communicate, via network 280, with a content provider to obtain content (e.g., video content, image content, advertising content, etc.) and/or access a service and/or application (e.g., via a website hosted by a content provider).

User device 210 may also correspond to a sender user device (referred to as "UD1") and/or a recipient user device (referred to as "UD2") with regard to FIGS. 1A-1B. Further, it will be apparent that, at any given time, user device 210 may act as a recipient user device or as a sender user device. Additionally, or alternatively, a single user device 210 may perform the functions of both a recipient user device and a sender user device.

Base station 220 may include one or more network devices that receive, process, and/or transmit traffic, such as audio, video, text, and/or other data, destined for and/or received from user device 210. In an example implementation, base station 220 may be an eNB device and may be part of the LTE network. Base station 220 may receive traffic from and/or send traffic to network 280 via SGW 230 and PGW 250. Base station 220 may send traffic to and/or receive traffic from user device 210 via an air interface. One or more of base stations 220 may be associated with a RAN, such as the LTE network.

SGW 230 may include one or more network devices, or other types of computation or communication devices, that gather, process, search, store, and/or provide information in a manner described herein. SGW 230 may include one or more data processing and/or traffic transfer devices, such as a gateway, a router, a modem, a switch, a firewall, a network interface card (NIC), a hub, a bridge, a proxy server, an optical add-drop multiplexer (OADM), or some other type of device that processes and/or transfers traffic. SGW 230 may, for example, aggregate traffic received from one or more base stations 220 and may send the aggregated traffic to network 280 via PGW 250. In one example implementation, SGW 230 may route and forward user data packets, may act as a mobility anchor for a user plane during inter-eNB handovers, and may act as an anchor for mobility between LTE and other 3GPP technologies. For idle state user device 210, SGW 230 may terminate a downlink (DL) data path and may trigger paging when DL data arrives for user device 210.

MME 240 may include one or more computation or communication devices that gather, process, search, store, and/or provide information in a manner described herein. For example, MME 240 may perform operations associated with a handoff to and/or from the EPS. MME 240 may perform operations to register user device 210 with the EPS, to handoff user device 210 from the EPS to another network, to handoff a user device 210 from the other network to the EPS, and/or to perform other operations. MME 240 may perform policing operations for traffic destined for and/or received from user device 210. MME 240 may authenticate user device 210 (e.g., via interaction with HSS/AAA server 260).

PGW 250 may include one or more network devices that gather, process, search, store, and/or provide information in a manner described herein. PGW 250 may include one or more data processing and/or traffic transfer devices, such as a gateway, a router, a modem, a switch, a firewall, a NIC, a hub, a bridge, a proxy server, an OADM, or some other type of device that processes and/or transfers traffic. PGW 250 may, for example, provide connectivity of user device 210 to external packet data networks by being a traffic exit/entry point for user device 210. PGW 250 may perform policy enforcement, packet filtering, charging support, lawful intercept, and/or packet screening. PGW 250 may also act as an anchor for mobility between 3GPP and non-3GPP technologies.

HSS/AAA server 260 may include one or more computation or communication devices, such as a server device. In some implementations, HSS/AAA server 260 may include a device that gathers, processes, searches, stores, and/or provides information in a manner described herein. For example, HSS/AAA server 260 may manage, update, and/or store, in a memory associated with HSS/AAA server 260, profile information associated with user device 210 that identifies applications and/or services that are permitted for and/or accessible by user device 210, bandwidth or data rate thresholds associated with the applications or services, information associated with a user of user device 210 (e.g., a username, a password, a personal identification number (PIN), etc.), rate information, minutes allowed, and/or other information. Additionally, or alternatively, HSS/AAA server 260 may include a device that performs authentication, authorization, and/or accounting (AAA) operations associated with a communication session with user device 210.

CSCF server 265 may include one or more computation or communication devices, such as a server device. In some implementations, CSCF server 265 may include a device that gathers, processes, searches, stores, and/or provides information in a manner described herein. CSCF server 265 may process and/or route calls to and from user device 210 via the EPC. For example, CSCF server 265 may process calls, received from network 280, that are destined for user device 210. In another example, CSCF server 260 may process calls, received from user device 210, that are destined for network 280.

BSF server 270 may include one or more computation or communication devices, such as a server device. In one implementation, BSF server 270 may include a server device that gathers, processes, searches, and/or provides information in a manner described herein. In one example implementation, BSF server 270 may identify and/or send information to HSS/AAA server 260 and/or NAF server 275, regarding authentication of user device 210 for a service (e.g., a secure messaging service). Additionally, or alternatively, BSF server 270 may authenticate user device 210 to access NAF server 275 (e.g., by providing user device 210 with a key and/or some other instrument) to send and/or receive encryption/decryption parameters (or some other information) to and/or from NAF server 275. In some implementations, BSF server 270 may identify authentication information of user device 210 based on a GBA technique in which BSF server 270 determines if user device 210 is authorized to use a service (e.g., secure messaging service) and if user device 210 is currently in an authorized session with network 280. In another implementation, BSF server 270 may identify authentication information of user device 210 using any other technique.

NAF server 275 may include one or more computation or communication devices, such as a server device. In one implementation, NAF server 275 may include a server device that gathers, processes, searches, and/or provides information in a manner described herein. In some example implementations, NAF server 275 may permit user device 210 to access a service (e.g., a secure messaging service), based on authentication information received from HSS/AAA server 260 and/or BSF server 270. NAF server 275 may interact with HSS/AAA server 260 and/or BSF server 270 to initiate authentication functions of user device 210. Additionally, or alternatively, NAF server 275 may interact with user device 210 to receive authentication information and present authentication information to HSS/AAA server 260 and/or BSF server 270. Additionally, or alternatively, NAF server 275 may interact with HSS/AAA server 260 and/or BSF server 270 to authenticate user device 210 to use application services (e.g., secure messaging application services) and/or to receive and/or send encryption/decryption parameters from/to user device 210. In one implementation, the interactions between NAF server 275, user device 210, HSS/AAA server 260, and/or BSF server 270 may be performed using the hypertext transfer protocol (HTTP) or the secure HTTP (HTTPS). In one implementation, the interactions between NAF server 275, user device 210, HSS/AAA server 260, and/or BSF server 270 may be performed using another type of protocol.

Network 280 may include one or more wired and/or wireless networks. For example, network 280 may include a cellular network, a public land mobile network (PLMN), a second generation (2G) network, a third generation (3G) network, a fourth generation (4G) network, a fifth generation (5G) network, and/or another network. Additionally, or alternatively, network 280 may include a wide area network (WAN), a metropolitan area network (MAN), a telephone network (e.g., the Public Switched Telephone Network (PSTN)), an ad hoc network, an intranet, the Internet, a fiber optic-based network (e.g., FiOS), and/or a combination of these or other types of networks.

While environment 200 has been described in terms of an EPS, this need not be the case. In another implementation, environment 200 may include devices associated with a system that does not include an LTE, an EPC and/or an IMS core.

FIG. 3 illustrates example components of a device 300 that may be used within environment 200 of FIG. 2. Device 300 may correspond to user device 210 and/or servers 260-275. Each of user device 210 and/or servers 260-275 may include one or more devices 300.

As shown in FIG. 3, device 300 may include a bus 305, a processor 310, a main memory 315, a read only memory (ROM) 320, a storage device 325 (also referred to as a local storage device or local storage), an input device 330, an output device 335, and a communication interface 340. In some implementations, device 300 may include additional components, fewer components, different components, or differently arranged components.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a mechanism that permits an operator to input information to device 300, such as a control button, a keyboard, a keypad, or another type of input device. Output device 335 may include a mechanism that outputs information to the operator, such as a light emitting diode (LED), a display, or another type of output device. Communication interface 340 may include any transceiver-like mechanism that enables device 300 to communicate with other devices or networks. In one implementation, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include space within a single physical memory device or spread across multiple physical memory devices.

The software instructions may be read into main memory 315 from another computer-readable medium, such as storage device 325, or from another device via communication interface 340. The software instructions contained in main memory 315 may cause processor 310 to perform processes that will be described later. Alternatively, hardwired circuitry may be used in place of or in combination with software instructions to implement processes described herein. Thus, implementations described herein are not limited to any specific combination of hardware circuitry and software.

FIGS. 4A-4B illustrate a call flow diagram of example operations capable of being performed by an example portion 400 of environment 200. As shown in FIGS. 4A-4B, portion 400 may include a sender user device 210 (shown as "UD1"), BSF server 270, NAF server 275, and a recipient user device 210 (shown as, "UD2"). UD1, BSF server 270, NAF server 275, and UD2 may include components and/or perform functions described above in connection with, for example, one or more of FIGS. 1A-3. FIG. 4 may correspond to example operations to identify parameters for encrypting and/or decrypting a secure message. FIG. 4 may also correspond to example operations for exchanging the parameters between UD1 and UD2 via BSF server 270 and/or NAF server 275 using multiple layers of authentication (e.g., in accordance with a GBA process and/or some other process).

As shown in FIG. 4, UD1 may receive and/or generate message 405. For example, UD1 may generate message 405 based on receiving input from a user, associated with UD1 (e.g., via a keypad or keyboard associated with UD1). In one example, the user may input text associated with message 405, identify the recipient of message 405, and instruct UD1 to make message 405 a secure message.

UD1 may send session request 410 based on receiving an instruction (e.g., via a user associated with UD1) to send message 405 to UD2 using a secure messaging application. Session request 410 may include a request for parameters, which may be used to generate an encryption key for message 405, and/or a request for a NAF key (to access NAF server). Session request 410 may also cause UD1 to initiate an authentication function with BSF server 270.

BSF server 270 receive session request 410 and may send NAF key 415 to UD1 based on successful authentication of UD1 to receive NAF key 415. In some implementations, NAF key 415 may be used to allow UD1 to access NAF server 275. Additionally, or alternatively, BSF server 270 may initiate an authentication function (e.g., a bootstrapping function in accordance with a GBA authentication process and/or some other process) to authenticate UD1 to receive NAF key 415.

BSF server 270 may determine and send parameters 416 to UD1 based on successful authentication of UD1 to receive parameters 416. Parameters 416 may be determined based on information embedded within a SIM card associated with UD1 (e.g., integrated circuit card identification (ICCID), international mobile subscriber identity (IMSI), international mobile equipment identify (IMEI), Ki authentication key, local area identity (LAI), short message service center (SMSC) number, service provider name (SPN), service dialing numbers (SDN), and/or some other information). Additionally, or alternatively, parameters 416 may be based on information in accordance with the 3GPP specification, such as information associated with a master key in HSS/AAA server 260, a BSF Transaction ID (B-TID), and/or a terminal app ID (e.g., a parameter that identifies a particular type of application, such as a secure messaging application). Additionally, or alternatively, parameters 416 may correspond to some other information, process, rule, and/or algorithm.

UD1 may send authentication request 420 to access NAF server 275 based on receiving NAF key 415 and parameters 416 from BSF server 270. In some implementations, authentication request 420 may include NAF key 415. NAF server 275 may initiate an authentication function of UD1 and authenticate UD1 based on receiving authentication request 420 and/or NAF key 415 from UD1. UD1 may access NAF server 275 to provide NAF server 275 with authentication information for an intended recipient of message 405 (i.e., UD2), and to provide NAF 275 with parameters which UD2 may receive and use to decrypt a secure message.

UD1 and NAF server 275 may exchange secure channel protocols 425 based on NAF server 275 authenticating UD1 to access NAF server 275 (as described above with respect to authentication request 420). Secure channel protocols 425 may be used to establish a secure channel between UD1 and NAF server 275.

UD1 may send parameters 426 and UD2 information 430 to NAF server 275 using the secure channel with NAF server 275. In some implementations, UD1 may determine parameters 426 based on parameters 416, and may include additional, fewer, or the same parameters as described above with respect to parameters 416. For example, parameters 426 may include ICCID, IMEI, IMSI, terminal application ID, and/or some other parameters.

In some implementations, UD2 information 430 may be based on a header of message 405, and/or information received from HSS/AAA server 260. For example, message 405 may include the telephone number 555-1000 in a header of message 405, corresponding to a telephone number of an intended recipient of message 405 (i.e., UD2). HSS/AAA server 260 may identify information associated with the telephone number, such as IMEI, ICCID, and/or some other information. UD2 information 430 may be received by NAF server 275 via the secure channel established by protocols 425. In some implementations, UD2 information 430 may be associated with authentication information for an intended recipient of message 405.

NAF server 275 may generate a token 435 and send token 435 to UD1. In some implementations, token 435 may be associated with information identifying parameters 426 and UD2 information 430, and may be used to identify corresponding parameters 426 and authentication information for UD2. An example data structure associated with token 435 is described later with respect to FIG. 5. NAF server 275 may send the generated token to UD1 using the secure channel, as described above with respect to protocols 425.

UD1 may execute an encryption and embedding instruction 440 to encrypt message 405 based on parameters 426. Instruction 440 may also cause UD1 to embed message 405 with token 435, based on receiving token 435 from NAF server 275. UD1 may generate secure message 445, based on executing instruction 440, as described above. Additionally, secure message 445 may include embedded token 435. As a result, secure message 445 includes token 435, which is associated with parameters 426 and with authentication information for an intended recipient user device (i.e., "UD2").

Continuing with the above example, and as shown in FIG. 4B, UD2 may receive secure message 445 from UD1. UD2 may receive secure message 445 via a secure channel, a secure transfer protocol, an unsecure channel, an unsecure transfer protocol, and/or some other technique. UD2 may identify secure message 445 as a secure message based on a header of the message, based on the token being embedded within the secure message, and/or based on some other indication.

UD2 may send session request 450 to BSF server 270 based on receiving secure message 445 and identifying the message as a secure message. Session request 450 may include a request for a NAF key, which may be used to access NAF server 275.

BSF server 270 may send NAF key 455 to UD2 based on successful authentication of UD2 to receive NAF key 455. In some implementations, BSF server 270 may initiate an authentication function (e.g., a bootstrapping function in accordance with a GBA authentication process and/or some other process) to authenticate UD2 to receive NAF key 455. In some implementations, UD2 may already possess NAF key 455 if a session already exists between UD2 and BSF server 270 (e.g., UD2 may have established a session with BSF server 270 to access a service including or excluding a secure messaging service). In such a case, UD2 may forgo initiating session request 450 to receive NAF key 455.

UD2 may send authentication request 460 to access NAF server 275 based on receiving NAF key 455 from BSF server 270. In some implementations, authentication request 460 may include NAF key 455. NAF server 275 may initiate an authentication function of UD2, based on receiving authentication request 460 and/or NAF key 455 from UD2. Additionally, or alternatively, NAF server 275 may receive authentication information from BSF server 270 to authenticate UD2 to access NAF server 275.

UD2 and NAF server 275 may exchange secure channel protocols 465 based on NAF server 275 authenticating UD2 to access NAF server 275 (as described above with respect to authentication request 460). Secure channel protocols 465 may be used to establish a secure channel between UD2 and NAF server 275.

As described above, UD2 may receive secure message 445 embedded with token 435. In some implementations, UD2 may read token 435 from secure message 445 and send token 435 to NAF server 275, via the secure channel established by the exchange of secure protocols 465.

NAF server 275 may send parameters 426 to UD2, based on identifying parameters 426 associated with token 435 and authenticating UD2 to receive parameters 426. In some implementations, NAF server 275 may authenticate UD2 to receive parameters 426 based on authentication information associated with token 435. For example, NAF server 275 may compare authentication information associated with token 435 with information associated with UD2 (e.g., IMEI, ICCID, and/or some other information), to authenticate UD2 to receive parameters 426. An example data structure of information associated with token 435 is described later with respect to FIG. 5. UD2 may execute message decryption instruction 470 to create a decryption key based on receiving parameters 416. UD2 may use the decryption key to decrypt secure message 445 and obtain the original message 405.

FIG. 5 illustrates an example data structure 500 that may be stored by a server, such as NAF server 275. In one implementation, data structure 500 may be stored in a memory of NAF server 275. In another implementation, data structure 500 may be stored in a memory separate from, but accessible by, NAF server 275. NAF server 275 may store multiple data structures 500 associated with different sets of parameters and authentication information. A particular instance of data structure 500, associated with set of parameters, may contain different information and/or fields than another instance of data structure 500, associated with another set of parameters.

In some implementations, data structure 500 may correspond to information associated with token 435. Additionally, or alternatively, data structure 500 may receive and/or store multiple entries or rows, where each entry or row corresponds to a token associated with a set of parameters and/or authentication information for user device 210. In an example shown in FIG. 5, data structure 500 may store three sets of parameters, where each set of parameters is associated with a unique token. In practice, data structure 500 may store any number of sets of parameters. As previously described, user device 210 may use a set of parameters to generate an encryption and/or decryption key for a message.

As shown in FIG. 5, data structure 500 may include token identification ("ID") field 510, parameters 1-N (where N≥1) fields 520-550, and recipient device authentication field 560. In some implementations, data structure 500 may include additional fields, fewer fields, different fields, or differently arranged fields than are shown in FIG. 5.

Token ID field 510 may store information to identify a token corresponding to a set of parameters and/or authentication information for user device 210. In an example shown in FIG. 5, token ID field 510 stores the numerical values 1, 2, and 3. In practice, token ID field 510 may store any character string to identify a corresponding set of parameters in a manner such that no two token IDs are the same. Token ID number 1 may store one set of parameters separate from the parameters stored by token ID number 2.

Parameter fields 520-550 may store information with regard to parameters used to generate an encryption and/or decryption key. In an example shown in FIG. 5, parameter field 520 may store information with regards to a first parameter (e.g., a B-TID number). Parameter field 520 may store the character string "74841566" associated with the first parameter (i.e., B-TID number). Parameter field 530 may store information with regard to a second parameter (e.g., a universal integrated circuit card (UICC)). Parameter field 530 may store the character string "45453687" associated with the second parameter (i.e., UICC). Parameter field 540 may store information with regard to a third parameter (e.g., a terminal app ID). Parameter field 540 may store the character string "5678" associated with the third parameter (i.e., terminal app ID). Parameter field 550 may store information with regard to some other parameter (i.e., "Parameter N" (where N≥1)). Additionally, or alternatively, data structure 500 may store information with regards to any number of parameters used to generate an encryption and/or decryption key. While shown as a numerical character string in FIG. 5, the information stored by parameter fields 520-540 include in any string of characters.

Recipient device authentication field 560 may store information with regards to recipient device authentication information associated with the parameters and/or the token ID. For example, assume that user device 210 has received a token with a token ID with the character string "1". Recipient device ID field 560 may store information to authenticate user device 210 to access the parameters associated with the token ID. For example, recipient device ID field 560 may store information associated with user device 210, such as a telephone number, IMEI, and/or ICCID. In an example shown in FIG. 5, recipient device authentication field 560 may store a telephone number (e.g., "5555551212"), an IMEI (e.g., "490154203237518"), and/or an ICCID (e.g., "321448984255827"). Recipient device ID field 560 may store additional or less information than what is shown in FIG. 5. In the above example, user device 210 may be authenticated to receive the parameters corresponding to token ID 1 if the telephone number, IMEI, and ICCID of user device 210 match the telephone number, IMEI, and ICCID information corresponding to token ID 1.

Figure 6:
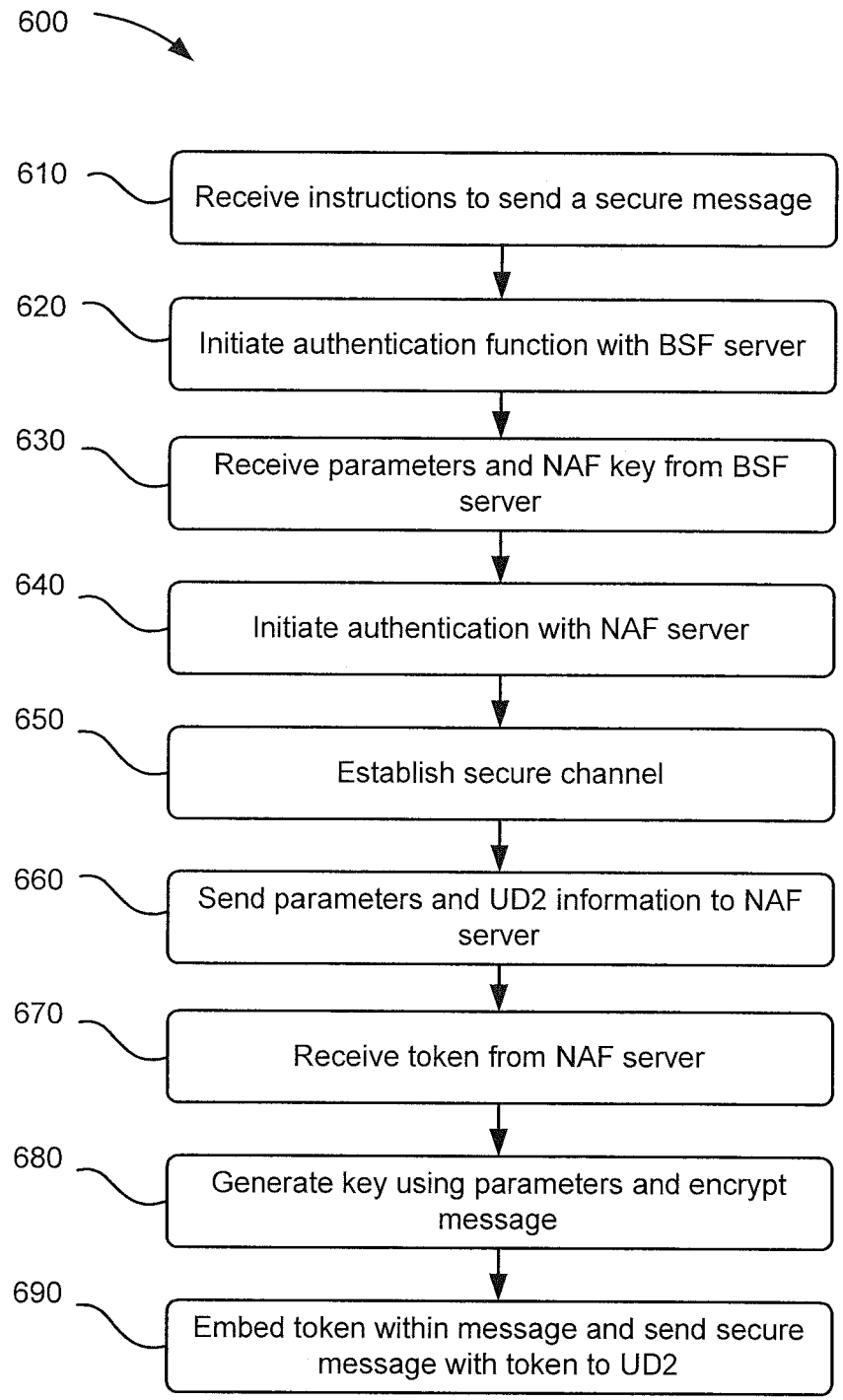
FIG. 6 illustrates a flowchart of an example process for encrypting and sending a message.

FIG. 6 illustrates a flowchart of an example process 600 for sending a secure message. In one implementation, process 600 may be performed by one or more components of user device 210, such as processing unit 305 of user device 210. In another implementation, one or more blocks of process 600 may be performed by one or more components of another device (e.g., one or more of servers 270 or 275), or any group of devices including or excluding user device 210. Process 600 may describe an example where a sender user device (i.e., "UD1") may determine parameters to create an encryption key for a message (e.g., message 405), encrypt the message using the encryption key, and send the message to a recipient user device (i.e., "UD2"). Process 600 may further describe an example where UD1 may send the parameters to UD2 (where UD2 may use the parameters to create a decryption key for the message) via servers 270-275 using multiple layers of authentication (e.g., in accordance with a GBA authentication process and/or some other authentication process).

As shown in FIG. 6, process 600 may include receiving instructions to send a secure message (block 610). For example, UD1 may receive instructions from a user, associated with UD1, to send a secure message to UD2. The message may be in the form of an SMS text, an e-mail, a computer file (e.g., image, audio, video, etc), or some other form.

Process 600 may further include initiating an authentication function with BSF server 275 (block 620). For example, as described above with respect to session request 410, UD1 may initiate an authentication function with BSF server 270 based on receiving the instruction to send a secure message. The authentication function may allow UD1 to receive parameters 416 and NAF key 415 to access NAF server 275.

Process 600 may also include receiving a NAF key and parameters from BSF server 270 (block 630). For example, UD1 may receive the NAF key and parameters as described above with respect to NAF key 415 and parameters 416, based on successful authentication of UD1 with BSF server 270.

Process 600 may further include initiating authentication with NAF server 275 (block 640). For example, as described above with respect to authentication request 420, UD1 may send authentication request 420 to access NAF server 275 based on receiving NAF key 415 from BSF server 270. Additionally, or alternatively, authentication request 420 may include NAF key 415.

Process 600 may also include establishing a secure channel (block 650). For example, as described above with respect to secure channel protocols 425, UD1 and NAF server 275 may exchange secure channel protocols 425 based on NAF server 275 authenticating UD1 to access NAF server 275. Secure channel protocols 425 may be used to establish a secure channel between UD1 and NAF server 275.

Process 600 may also include sending parameters and UD2 information to NAF server 275 (block 660). For example, as described above with respect to parameter 426 and UD2 information 430, UD1 may determine parameters 426 based on parameters 416, IMEI, ICCID, IMSI, and/or some other parameters. UD1 may send parameters 426 and UD2 information 430 (e.g., such as authentication information for UD2) to NAF server 275 using the secure channel with NAF server 275.

Process 600 may further include receiving a token from NAF server 275 (block 670). For example, as described above with respect to token 435, UD1 may receive token 435 from NAF server 275, based on sending parameters 426 and UD2 information 430. In some implementations, token 435 may store information identifying parameters 426 and UD2 information 430. As described above, UD2 may use token 435 to receive parameters 426 from NAF server 275, and use parameters 426 to decrypt a secure message.

Process 600 may also include generating a key using parameters and encrypting the message based on the parameters (block 680). For example, as described above with respect to encryption and embedding instruction 440, UD1 may execute instruction 440 to generate a key using parameters 426 and encrypt message 405 based on the key.

Process 600 may further include embedding the token within the message and sending the encrypted message with the token to UD2 (block 690). For example, as described above with respect to encryption and embedding instruction 440 and secure message 445, UD1 may execute instruction 440 to embed token 435 within secure message 445 (e.g., by storing the token in a header of the secure message, and/or using some other embedding technique). Additionally, UD1 may send secure message 445 to UD2, as described above. As a result, UD2 may receive secure message 445, embedded with token 435, which UD2 may use to receive parameters 426 from NAF server 275 to decrypt secure message 445 sent by UD1.

While an example of process 600 is described in FIG. 6 in terms of two user devices (i.e., "UD1" and "UD2"), in practice, process 600 is not so limited and may apply to an environment with any number of user devices 210. For example, process 600 may apply in an environment with any number of sender user devices exchanging information with any number of recipient user devices. Further, a single user device 210 may perform the functions of both a sender user device and a recipient user device.

Figure 7:
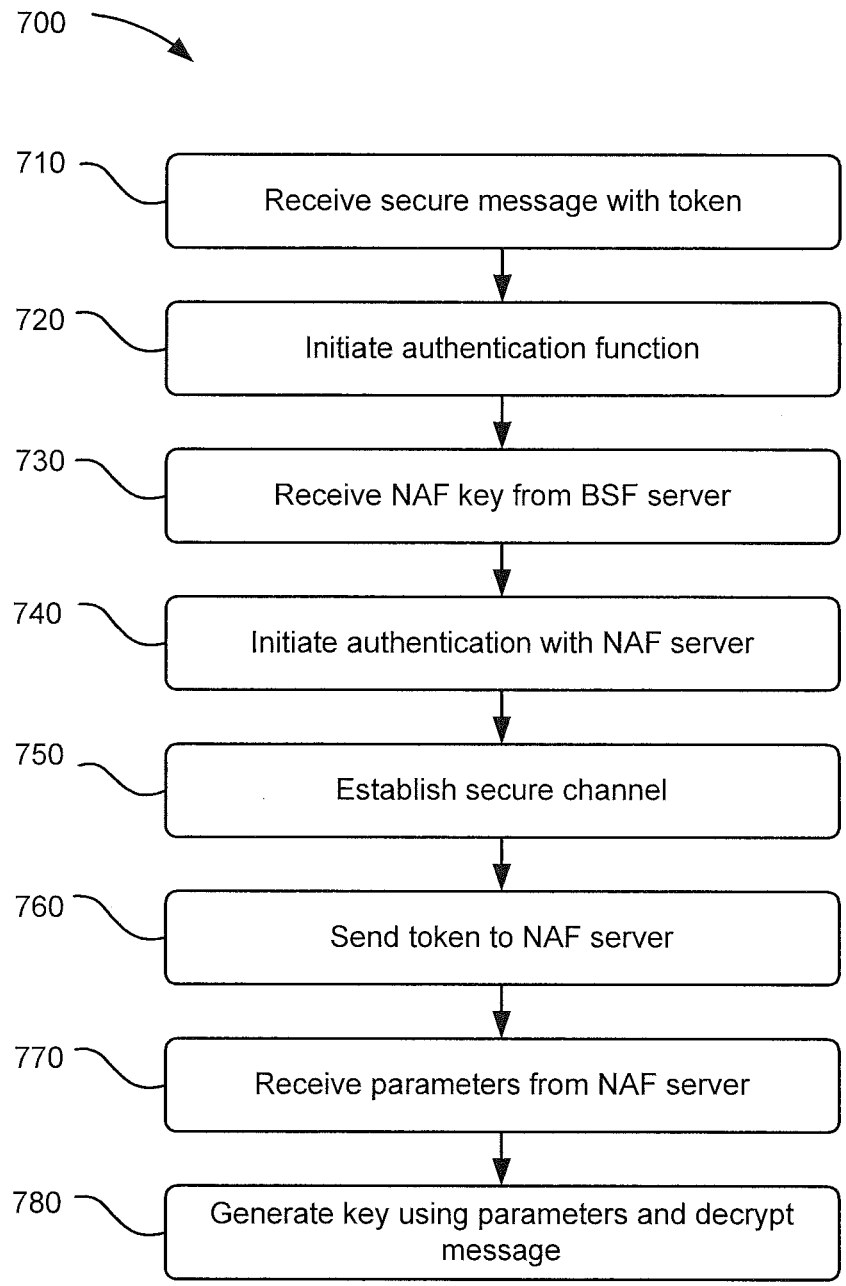
FIG. 7 illustrates a flowchart of an example process for receiving and decrypting a secure message.

FIG. 7 illustrates a flowchart of an example process 700 for receiving and decrypting a secure message. In one implementation, process 700 may be performed by one or more components of user device 210, such as processing unit 305 of user device 210. In one implementation, one or more blocks of process 700 may be performed by one or more components of another device (e.g., one or more of servers 270 or 275), or any group of devices including or excluding user device 210. Process 700 may describe an example where a recipient user device (i.e., "UD2") may receive parameters via servers 270-275 to decrypt a secure message received from a sender user device (i.e., "UD1"). UD2 may access servers 270-275 to receive the parameters through multiple layers of authentication using a GBA authentication process and/or some other authentication process.

As shown in FIG. 7, process 700 may include receiving a secure message with a token (block 710). For example, UD2 may receive secure message 445 with embedded token 435 from UD1, as described above. In some implementations, the encrypted message may be received using a secure transfer protocol, or some other protocol and/or technique.

Process 700 may further include initiating an authentication function (block 720). For example, as described above with respect to session request 410, UD2 may initiate an authentication function based on receiving secure message 445.

Process 700 may also include receiving a NAF key from BSF server 270 (block 730). For example, UD2 may receive the NAF key as described above with respect to NAF key 455, based on successful authentication of UD2 with BSF server 270. NAF key 455 may be used to access NAF server 275, which may allow UD2 to receive parameters to decrypt secure message 445.

In some implementations, blocks 720-730 may be omitted in an implementation in which a session already exists between UD2 and BSF server 270 (e.g., UD2 may have established a session with BSF server 270 to access a service including or excluding a secure messaging service).

Process 700 may further include initiating authentication with NAF server 275 (block 740). For example, as described above with respect to authentication request 460, UD2 may send authentication request 460 to access NAF server 275 based on receiving NAF key 455 from BSF server 270.

Process 700 may also include establishing a secure channel (block 750). For example, as described above with respect to secure channel protocols 465, UD2 and NAF server 275 may exchange secure channel protocols 465 based on NAF server 275 authenticating UD2 to access NAF server 275. Secure channel protocols 465 may be used to establish a secure channel between UD2 and NAF server 275.

Process 700 may further include sending the token to NAF server 275 (block 760). For example, as described above with respect to token 435, UD2 may send token 435 from NAF server 275, using the secure channel with NAFS 435.

Process 700 may also include receiving parameters from NAF server 275 (block 770). For example, as described above, UD2 may receive parameters 426 from NAF server 275 via the secure channel, based on NAF server 275 receiving token 435, authenticating UD2 based on authentication information associated with token 435, and identifying parameters 426 associated with token 435.

Process 700 may further include generating a key using parameters and decrypting the secure message using the key (block 780). For example, as described above with respect to message decryption instruction 460, UD2 may execute instruction 460 to generate a key using parameters 426 and decrypt secure message 445 using the key.

While an example of process 700 is described in FIG. 7 in terms of two user devices (i.e., "UD1" and "UD2"), in practice, process 700 is not so limited and may apply to an environment with any number of user devices 210. For example, process 700 may apply in an environment with any number of sender user devices exchanging information with any number of recipient user devices. Further, a single user device 210 may perform the functions of both a sender user device and a recipient user device.

Figure 8:
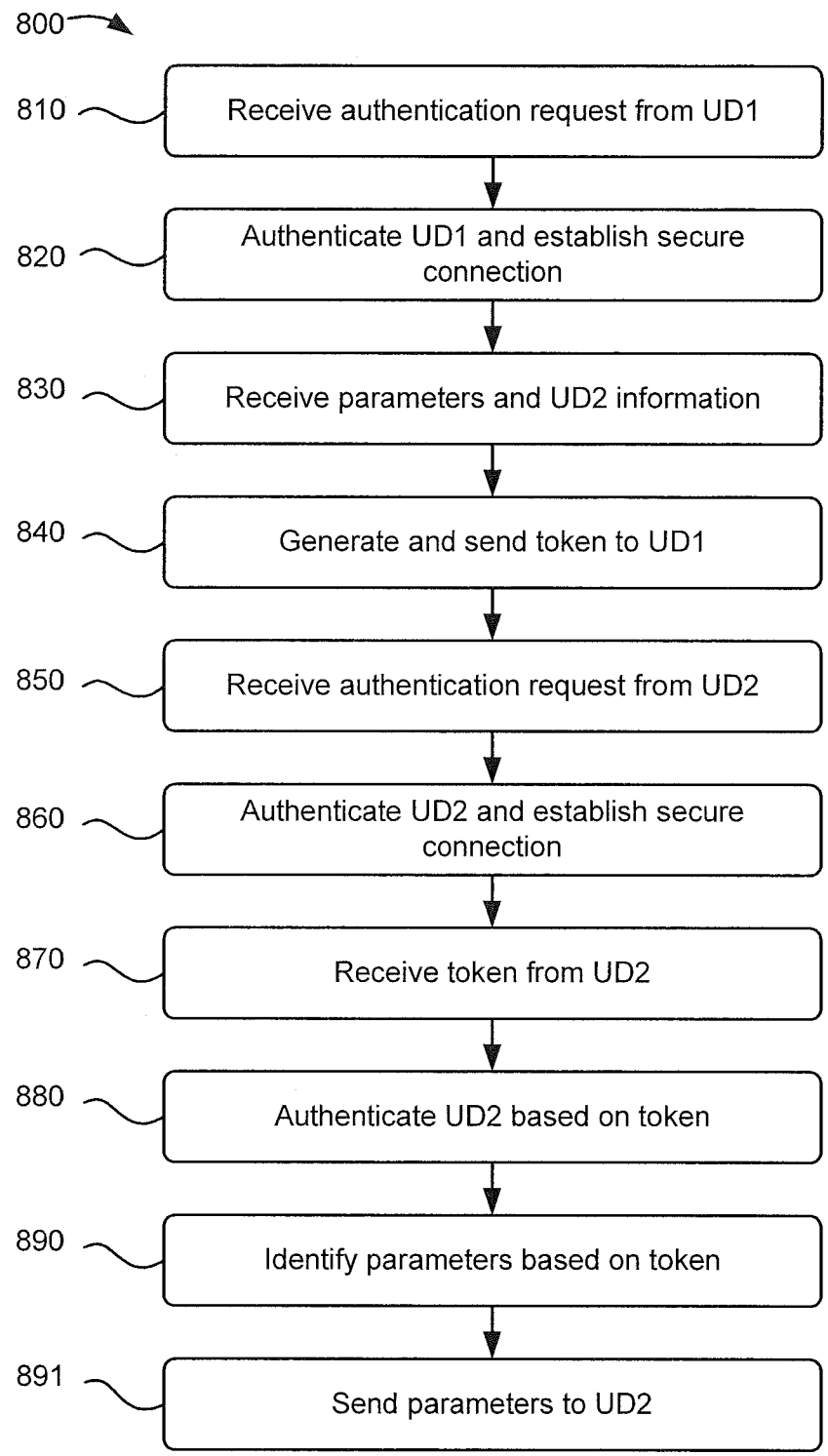
FIG. 8 illustrates a flowchart of an example process for exchanging parameters between user devices via a network authentication function server.

FIG. 8 illustrates a flowchart of an example process 800 for exchanging parameters between user devices UD1 and UD2 via an authentication server, such as NAF server 275. In some implementations, the authentication server may act as a secure gatekeeper to exchange the parameters between UD1 and UD2 by receiving the parameters from UD1 and sending the parameters to UD2. In one implementation, process 800 may be performed by one or more components of NAF server 275, such as processing unit 305 of NAF server 275. In one implementation, one or more blocks of process 800 may be performed by one or more components of another device (e.g., one or more of servers 260-270), or any group of devices including or excluding NAF server 275.

As shown in FIG. 8, process 800 may include receiving an authentication request from UD1 (block 810). For example, as described above with respect to authentication request 420, NAF server 275 may receive an authentication request, which include NAF key 415, from UD1. NAF server 275 may authenticate UD1 based on receiving authentication request 420 and/or NAF key 415.

Process 800 may also include authenticating UD1 and establishing a secure connection (block 820). For example, as described above with respect to authentication request 420 and secure channel protocols 425, NAF server 275 may authenticate UD1 and establish a secure channel based on exchanging secure channel protocols 425 with UD1. In some implementations, NAF server 275 may authenticate UD1 based on authentication information associated with NAF key 415, information received from BSF server 270 and/or HSA/AAA server 260, and/or information received from some other device.

Process 800 may also include receiving parameters and UD2 information (block 830). For example, as described above with respect to parameters 426 and UD2 information 430, NAF server 275 may receive parameters 426 and UD2 information 430 over the secure channel, as described above. In some implementations, UD2 information 430 may correspond to a phone number of an intended recipient of message 405 (i.e., UD2), and/or some other information associated with UD2.

Process 800 may further include generating and sending a token to UD1 (block 840). For example, as described above with respect to token 435, NAF server 275 may generate a token associated with UD2 information and parameters 426 (e.g., by executing an instruction that generates a token and associates the token with a token ID, parameters 426, and/or UD2 information. Token 435 may be used to identify parameters 426 and to authenticate an intended recipient (i.e., UD2) of message 405.

Process 800 may also include receiving an authentication request from UD2 (block 850). For example, as described above with respect to authentication request 460, NAF server 275 may receive an authentication request including NAF key 455 from UD2. NAF server 275 may authenticate UD2 based on receiving authentication request 420 with NAF key 455.

Process 800 may also include authenticating UD2 and establishing a secure connection (block 860). For example, as described above with respect to authentication request 460 and secure channel protocols 465, NAF server 275 may authenticate UD2 and establish a secure channel based on exchanging secure channel protocols 465 with UD2. In some implementations, NAF server 275 may authenticate UD2 based on authentication information associated with NAF key 415, information received from BSF server 270 and/or HSA/AAA server 260, and/or information received from some other device.

Process 800 may further include receiving the token from UD2 (block 870). For example, as described above with respect to token 435, NAF server 275 may receive token 435 from UD2 via the secure channel created based on exchanging secure protocols 465.

Process 800 may also include authenticating UD2 based on the token (block 880). For example, NAF server 275 may compare authentication information associated with token 435 with authentication information associated with UD2 (e.g., IMEI, ICCID, and/or some other information), to authenticate UD2 to receive parameters 426.

Process 800 may further include identifying parameters based on the token (block 890). For example, based on successful authentication of UD2, NAF server 275 may identify parameters 426 associated with token 435. In some implementations, NAF server 275 may identify a token ID associated with token 435, and identify the parameters associated with the identified token ID.

Process 800 may further include sending parameters to UD2 (block 891). For example, NAF server 275 may include sending parameters 426 to UD2, via the secure channel, based on identifying parameters 426 associated with token 435, and based on authenticating UD2 to receive parameters 426, as described above.

While an example of process 800 is described in FIG. 8 in terms of two user devices (i.e., "UD1" and "UD2"), in practice, process 800 is not so limited and may apply to an environment with any number of user devices 210. For example, process 800 may apply in an environment with any number of sender user devices exchanging information with any number of recipient user devices. Further, a single user device 210 may perform the functions of both a sender user device and a recipient user device.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 6-8, the order of the blocks may be modified in other implementations. Further, non-dependent blocks may be performed in parallel.

Also, while NAF server 275 and BSF server 270 are described as separate devices, in practice, NAF server 275 and BSF server 270 may implemented as one device. Additionally, or alternatively, one or more operations performed by NAF server 275 or BSF server 270 could be performed by another device, such as HSS/AAA server 260 and/or CSCF server 265.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A first device comprising:
a memory; and
one or more processors to:
receive an instruction to send a message from the first device to a second device;
communicate with a first server to obtain a first set of parameters and a first key based on the instruction to send the message from the first device to the second device;
send the first key to a second server;
establish a secure connection with the second server based on sending the first key;
determine a second set of parameters based on the first set of parameters;
send, via the secure connection and to the second server, the second set of parameters with information associated with the second device;
generate a second key based on the second set of parameters;
encrypt the message based on the second key;
embed, within the encrypted message, a token associated with the first set of parameters and with the information associated with the second device; and
send, after embedding the token within the encrypted message, the encrypted message to the second device, the second device being capable of identifying that the encrypted message is secure based on a header of the encrypted message, providing the token to the second server to receive the second set of parameters from the second server, and using the second set of parameters to generate a decryption key to decrypt the encrypted message, and
the second server authenticating the second device to determine that the second device is authorized to receive the second set of parameters prior to sending the second set of parameters to the second device.

2. The first device of claim 1, where the one or more processors are further to:
receive the token from the second server.

3. The first device of claim 1,
where the one or more processors are further to:
initiate an authentication function with the first server, and
where the first set of parameters and the first key are received from the first server based on executing the authentication function.

4. The first device of claim 1,
where the one or more processors are further to:
initiate an authentication function with the second server based on sending the first key to the second server, and
where the secure connection is established with the second server further based on executing the authentication function.

5. A non-transitory computer-readable medium storing instructions, the instructions comprising:
a plurality of instructions which, when executed by one or more processors of a first device, cause the one or more processors to:
receive an instruction to send a message from the first device to a second device;
communicate with a first server to obtain a first set of parameters based on the instruction to send the message from the first device to the second device;
determine a second set of parameters based on the first set of parameters;
establish a secure connection with a second server;
send, via the secure connection and to the second server, the second set of parameters with information associated with the second device;
receive a token from the second server, the token being associated with the second set of parameters and the information associated with the second device;
generate an encryption key based on the second set of parameters;
encrypt the message based on the encryption key;
embed the token within the encrypted message; and
send the encrypted message with the token to the second device,
the second device being capable of identifying that the encrypted message is secure based on a header of the encrypted message, receiving the second set of parameters from the second server based on sending the token to the second server, and generating a decryption key based on the second set of parameters to decrypt the encrypted message.

6. The non-transitory computer-readable medium of claim 5,
where the instructions further comprise:
one or more instructions which, when executed by the one or more processors, cause the one or more processors to:
receive a first key from the first server; and
send the first key to the second server, and
where the secure connection is established with the second server based on sending the first key to the second server.

7. The non-transitory computer-readable medium of claim 6,
where the instructions further comprise:
one or more instructions which, when executed by the one or more processors, cause the one or more processors to:
initiate an authentication function with the second server based on sending the first key to the second server, and
where the secure connection is established with the second server further based on executing the authentication function.

8. The non-transitory computer-readable medium of claim 5,
where the instructions further comprise:
one or more instructions which, when executed by the one or more processors, cause the one or more processors to:
initiate an authentication function with the first server, and
where the first set of parameters are received from the first server based on executing the authentication function.

9. The non-transitory computer-readable medium of claim 8,
where the instructions further comprise:
one or more instructions which, when executed by the one or more processors, cause the one or more processors to:
establish the secure connection with the first server based on executing the authentication function in accordance with a generic bootstrapping architecture technique.

10. A method comprising:
receiving, by a first device, a secure message with an embedded token from a second device,
the token being generated by a second server based on a first set of parameters and information associated with the first device;
identifying, by the first device, that the secure message is secure based on a header of the secure message;
communicating, by the first device, with a first server to receive a first key based on receiving the secure message;
sending, by the first device, the first key to the second server;
establishing, by the first device, a secure connection with the second server based on sending the first key;
sending, by the first device, the token to the second server;
receiving, by the first device, a second set of parameters, from the second server, via the secure connection after the second server authenticates the first device to receive the second set of parameters based on comparing authentication information associated with the token with information associated with the first device,
the second set of parameters, with the information associated with the first device, being provided to the second server by the second device;
generating, by the first device, a second key based on the second set of parameters; and
decrypting, by the first device, the secure message using the second key.

11. The method of claim 10, further comprising:
initiating an authentication function with the first server,
the first key being received from the first server based on executing the authentication function.

12. The method of claim 10, further comprising:
initiating an authentication function with the second server based on sending the first key to the second server,
the secure connection being established with the second server further based on executing the authentication function.

13. A system comprising:
a memory; and
one or more processors to:
receive a first authentication request from a first device,
the first device receiving a first set of parameters and determining a second set of parameters based on the first set of parameters;
authenticate the first device based on the first authentication request;
establish a secure connection with the first device based on authenticating the first device;
receive, via the secure connection and from the first device, the second set of parameters with information associated with a second device,
the first device being capable of generating an encryption key for a secure message based on the second set of parameters, using the encryption key to encrypt the secure message, and sending the secure message to the second device, and
the second device being capable of identifying that the secure message is secure based on a header of the secure message;
generate a token associated with the second set of parameters and with the information associated with a second device;
send the token to the first device;
receive a second authentication request from the second device;
establish a secure connection with the second device based on receiving the second authentication request;
receive the token from the second device;
authenticate the second device to receive the second set of parameters by comparing authentication information associated with the token with the information associated with the second device;

identify the second set of parameters associated with the token; and send, via the secure connection with the second device, the second set of parameters to the second device, the second device being capable of generating a decryption key for the secure message based on the second set of parameters.

14. The system of claim 13, where, when receiving the first authentication request from the first device, the one or more processors are to:
receive the encryption key from the first device, and where, when authenticating the first device, the one or more processors are to:
authenticate the first device based on the encryption key.

15. The system of claim 13, where, when receiving the second authentication request from the second device, the one or more processors are to:
receive a different key from the second device, and where, when authenticating the second device, the one or more processors are to:
authenticate the second device based on the different key.

16. A non-transitory computer-readable medium storing instructions, the instructions comprising:

a plurality of instructions which, when executed by one or more processors, cause the one or more processors to:
establish a secure connection with a first device,
the first device receiving a first set of parameters and determining a second set of parameters based on the first set of parameters;
receive, via the secure connection with the first device and from the first device, the second set of parameters with information associated with a second device,
the first device being capable of generating an encryption key for a secure message based on the second set of parameters, using the encryption key to encrypt the secure message, and sending the secure message to the second device, and
the second device being capable of identifying that the secure message is secure based on a header of the secure message;
generate a token associated with the second set of parameters and the information associated with the second device;
send the token to the first device;
establish a secure connection with the second device;
receive, via the secure connection with the second device, the token from the second device;
authenticate the second device to receive the second set of parameters by comparing authentication information associated with the token with the information associated with the second device;
identify the second set of parameters associated with the token; and
send, via the secure connection with the second device, the second set of parameters to the second device,
the second device being capable of generating a decryption key for the secure message based on the second set of parameters.

17. The non-transitory computer-readable medium of claim 16, where the instructions further comprise:
one or more instructions which, when executed by the one or more processors, cause the one or more processors to:
receive a first authentication request from the first device; and
authenticate the first device based on the first authentication request, and where the secure connection is established with the first device based on authenticating the first device.

18. The non-transitory computer-readable medium of claim 17, where the first authentication request, from the first device, includes a key used to authenticate the first device.

19. The non-transitory computer-readable medium of claim 16, where the instructions further comprise:
one or more instructions which, when executed by the one or more processors, cause the one or more processors to:
receive a second authentication request from the second device; and
authenticate the second device based on the second authentication request, and where the secure connection is established with the second device based on authenticating the second device.

20. The non-transitory computer-readable medium of claim 19, where the second authentication request from the second device, includes a key used to authenticate the second device.

21. The non-transitory computer-readable medium of claim 16, where the instructions further comprise:
one or more instructions which, when executed by one or more processors, cause the one or more processors to:
authenticate the second device based on the information associated with the second device after receiving the token from the second device, and where the second set of parameters is sent to the second device based on authenticating the second device.

* * * * *